United States Patent [19]

Clavier

[11] Patent Number: 4,556,047

[45] Date of Patent: Dec. 3, 1985

[54] SOLAR FURNACE

[76] Inventor: Philippe A. Clavier, P.O. Box 568, Bodega Bay, Calif. 94923

[21] Appl. No.: 691,758

[22] Filed: Jan. 15, 1985

Related U.S. Application Data

[62] Division of Ser. No. 351,018, Feb. 22, 1982, Pat. No. 4,508,099.

[51] Int. Cl.[4] .................................................. F24J 3/02
[52] U.S. Cl. ...................................... 126/400; 126/417; 126/901; 52/307
[58] Field of Search ............... 126/400, 417, 901, 450, 126/431; 52/306, 307; 350/1.6, 1.7, 262, 264, 265, 258, 299

[56] References Cited

U.S. PATENT DOCUMENTS

| | | | |
|---|---|---|---|
| 2,179,862 | 11/1939 | Rolph | 350/262 |
| 3,003,375 | 9/1961 | Golay | 126/417 |
| 3,272,986 | 9/1966 | Schmidt | 126/901 |
| 3,531,313 | 9/1970 | Dates | 350/1.7 X |
| 4,177,325 | 12/1979 | Roberts et al. | 126/417 X |
| 4,180,954 | 1/1980 | Gell, Jr. | 350/1.7 X |
| 4,326,012 | 4/1982 | Charlton | 350/258 X |

FOREIGN PATENT DOCUMENTS

| | | | |
|---|---|---|---|
| 2911552 | 10/1980 | Fed. Rep. of Germany | 126/901 |
| 47701 | 1/1977 | Japan | 126/901 |
| 839753 | 6/1960 | United Kingdom | 52/307 |

*Primary Examiner*—Randall L. Green
*Attorney, Agent, or Firm*—Donald D. Mon

[57] ABSTRACT

The solar furnace is constructed of evacuated glass block solar elements that include an interior face, or surface, of zinc. Because of this material, substantial solar radiant energy is retained and radiated to the interior of the furnace, permitting the furnace to reach temperatures of 300° C. and more when located at latitudes between the 35th parallels. Evacuated insulating elements contain the furnace's heat, each element being an evacuated block with one or more preferably reflective interior panels.

11 Claims, 6 Drawing Figures

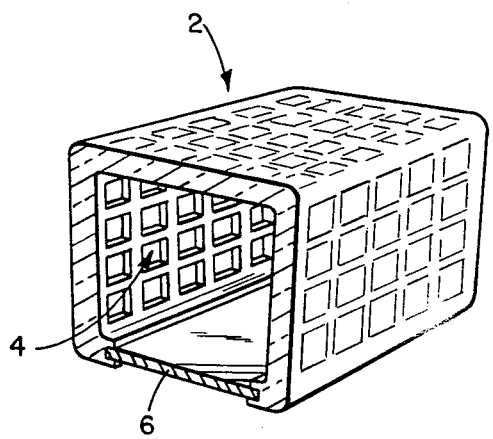
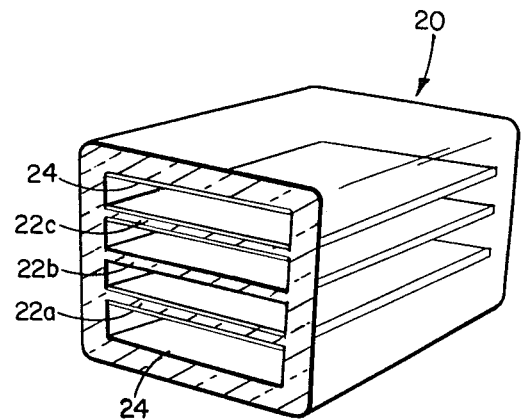
FIG. 1
FIG. 3
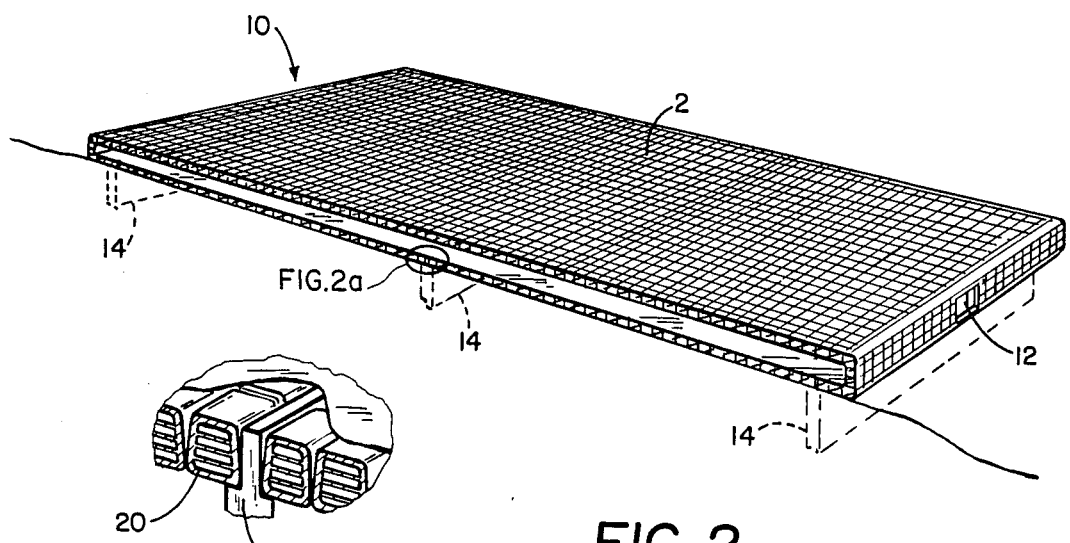
FIG. 2
FIG. 2a

SOLAR FURNACE

This application is a division of U.S. Ser. No. 351,018, filed Feb. 22, 1982, which is now U.S. Pat. No. 4,508,099.

BACKGROUND OF THE INVENTION

The invention concerns a solar furnace, more particularly a furnace constructed of elements designed to maximize internal temperatures attainable from solar radiant energy.

With the escalating costs of fossil energy sources, solar energy is becoming ever more attractive. Solar radiation itself, of course, is free. The cost of the equipment required to transform solar energy to useful applications stabilizes the total cost of this energy source at the cost of construction, thereby avoiding the price increases which seem to be an inevitable part of fossil energy sources. Further, with appropriate design solar energy can be converted to useful application at significant cost savings over the present cost of fossil energy. For these and other reasons, then, solar energy systems are projected to provide over 60% of today's energy requirements in the year 2020.

Various collectors of solar energy have been designed. Uniformly, they are designed to make more effective use of solar energy. Some are intended to satisfy household heating requirements; others are capable of, or designed for, other uses. In U.S. Pat. No. 3,000,375 issued to Marcel Golay on Sept. 19, 1961 an evacuated heat absorbent body, or block, is described. This block, apparently constructed of glass, is evacuated or filled with a gas of low thermal conductivity. In the lower portion of the block, or on its base, is a polished reflective base plate that bears a thin film of a semiconductive black coating, such as of tellurium, positioned to receive solar radiation. While such a structure certainly is useful, it is costly to fabricate, in large part because of construction of the base plate and its evaporated coating. This in turn significantly constrains the applications in which it can be used, and limits its cost effectiveness when compared as an energy source with the various conventional fossil fuel energy sources.

It would be highly desirable to provide a solar furnace, and solar heating elements, of economic construction that would provide a solar energy source that, at maximum, would be no more expensive than the cost of other, conventional fossil fuel energy sources. Further, it would be desirable to provide such elements as part of a solar furnace, capable of obtaining and maintaining temperatures of 200° C. and above for extended periods. Also, an effective insulator is necessary to contain and conserve energy, whether of a solar or fossil source, and in a furnace or elsewhere. These and other objects of the invention will be apparent to those skilled in this art from the following description.

BRIEF SUMMARY OF THE INVENTION

The invention provides a solar furnace of high temperature capability, and the elements required to construct such a furnace.

The solar furnace consist of an environment defined at least in part by elements substantially transparent to solar radiation, and insulating elements surrounding and constituting, with the transparent elements, the solar heated environment.

Each transparent element preferably includes means for absorbing substantial incident solar radiant energy and retaining a substantial amount of the absorbed radiant energy, and means transparent to the solar radiant energy for insulating the absorbing means to conduction currents. This insulating means, in the preferred embodiment, is substantially transparent to solar radiant energy but opaque to radiation from the absorbing means. Convection currents may be employed in the furnace to conduct radiant energy from the absorbing means to a location spaced from the absorbing means. In the preferred embodiment, the absorbing means is a zinc material.

The solar or transparent element is constructed as a hollow evacuated block with glass inner and outer faces the zinc material being on one inner surface of the block and providing said absorbing means. The glass of the solar element is chosen to be substantially transparent to solar radiant energy but opaque to energy re-radiated by the zinc material. In one embodiment, the zinc material may be a zinc coating on one inner surface of the solar element; in another embodiment a zinc inner panel may be provided.

The insulating element preferably consists of a hollow, evacuated structure having a series of internal panels some of which absorb substantially all radiant energy and others of which reflect substantially all radiant energy, the absorbing and reflecting panels alternating through the block. In another embodiment, only reflecting panels may be used. Preferrably at least the reflecting panels are metallized. The absorbing panels, if used, preferably are black bodies at the operating temperature of the furnace (a black body is one that absorbs all radiating energy it receives).

The solar furnace offers significant advantages. Among its advantages are:

Capable of reaching temperatures of up to 400° C. at a price competitive with, for instance, No. 2 fuel oil.

Once constructed there is no further energy expense.

Pollution free.

When compared with other solar systems, the furnace:

Offers much higher temperatures than the usual non focussing solar systems.

Is much less costly than highly focussing solar systems.

Provides a constant heat source independent of night or day because of its heat mass.

Permits total use of the land available for collecting the sun (no wasted land as with highly focussing systems).

Has no moving components, hence no energy is required to move components.

Collects at least in part the albedo (sun rays scattered by the atmosphere and clouds), hence maintains high temperatures even on poor days.

Provides insulation of about 50 cm thickness that is equal to the insulation of a concrete slab 12 m. thick.

BRIEF DESCRIPTION OF THE DRAWINGS

The invention will be further described in connection with the accompanying drawings in which:

FIG. 1 is a vertical cross-sectional view in perspective of a portion of a solar element of the invention;

FIG. 2 is a vertical cross-sectional view in perspective of a portion of the Solar Furnace of the invention;

FIG. 2a is an enlarged view of area of FIG. 2 showing side by side elements.

FIG. 3 is a vertical cross-sectional view in perspective of a portion of an insulating element of the invention;

DETAILED DESCRIPTION

Figure 4:
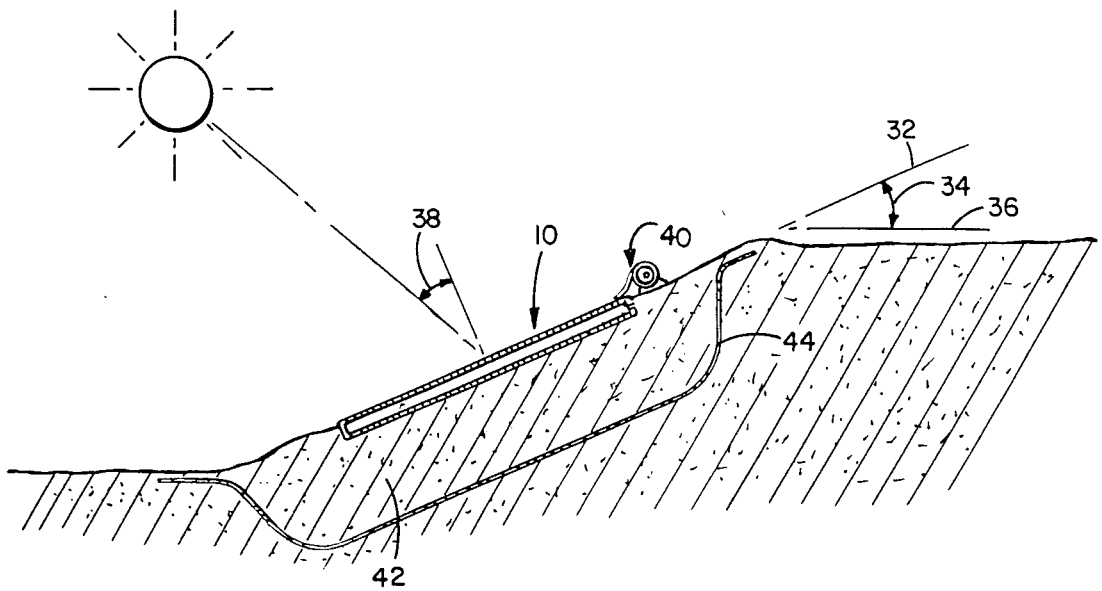
FIG. 4 is a vertical cross-sectional view illustrating the construction and placement of the Solar Furnace.

The solar furnace of this invention, while quite simple in construction, is uniquely effective in application. It is quite capable of attaining temperatures of between 200° and 400° C. (approximately 400° to 750° F.) and of maintaining such temperatures over periods spanning days and even weeks. Thus, it offers significant advantages in many industrial processes, processes such as the refining of shale oil and power generation.

The solar furnace employs to unique advantage a well-known effect, the greenhouse effect. When solar radiation shines through the earth's atmosphere, some of it is absorbed by the earth and oceans to heat these bodies. Everything above a temperature of absolute zero will radiate energy, the amount of radiated energy being a function of temperature. Thus, the oceans and the earth will re-radiate the absorbed solar energy. This re-radiation will be at a different frequency spectrum than the energy radiated by the sun; specifically, the re-radiation is centered about a significantly longer wave-length. Since the atmosphere is relatively more opaque to this frequency band, the re-radiated energy is absorbed by the atmosphere, thereby trapping some of the solar energy and increasing the overall temperature of the earth's environment. Such trapping of solar energy also occurs, but on a smaller scale, in a greenhouse. Solar energy passes through the glass or other panels which define the greenhouse, is absorbed by the earth, plants and other materials within the greenhouse, then re-radiated into the atmosphere within the greenhouse at a different frequency (one to which the atmosphere and glass are more opaque) to be further absorbed by that atmosphere, thereby increasing the temperature within the greenhouse to a level significantly above the outside temperature.

The present invention provides an environment and structure that is uniquely suited to maximize the captured and retained solar energy. It selects and associates materials and elements in a structure that is well suited to attaining high temperatures from a solar energy source.

Of course, the amount of incident solar energy on any point of the earth's surface is directly related to the location of the sun with respect to that point. There is the obvious day and night fluctuation of such energy. Also, solar energy fluctuates with the seasons. In addition, the total amount of energy, or the maximum energy received by any point on the earth's surface, is a function of its latitude; the closer the point is to the equator, the greater the total amount of solar energy received by that point. Finally, such incident energy is also a function of weather, the cloud cover and moisture content of the atmosphere causing variations in such energy, and scattering parts of the transmitted sun rays to form the albedo.

In many applications it is desirable to provide a solar furnace that does not experience substantial variations in internal temperature from day to day. The furnace required by many applications should be capable of maintaining approximately the same temperature for days or even weeks at a time. Since sunlight illuminates any point on the earth for only a portion of each day, the heat mass of the collecting system and of the furnace therefore should be large enough to retain sufficient energy to maintain its internal temperature throughout the night. This is contrary to many prior solar systems. Often they have sought to minimize the heat mass of the system to quickly attain operating temperatures. While a large heat mass will delay the attainment of operating temperatures, it will maintain such temperatures for a longer period. By using a sufficiently large heat mass, operating termperatures can be maintained for days if desired.

All the various elements of the structure described herein are well suited to providing any of a variety of solar heated environments. In a preferred application, that of a solar furnace, an environment having a large thermal mass is defined. This environment is capable of maintaining a substantial temperature for days and weeks at a time by virtue of its construction, and because of the elements it employs.

Two different types of elements are used in the preferred solar furnace construction. One of the elements, termed a solar element, includes a face that is substantially transparent to solar radiation. The other element, termed an insulating element, is uniquely suited to prevent the transfer of energy, particularly radiant or heat energy, through it. Both elements, of course, have significant application apart from the furnace herein described.

The construction of a preferred solar element is shown in vertical cross-section in FIG. 1. In the preferred embodiment, the solar element 2 is fabricated as a hollow, evacuated glass block. To minimize convection heat losses, the block should be evacuated to a pressure of below $10^{-3}$ bars, to minimize conduction heat losses as well a pressure of below $10^{-4}$ bars would be better. The faces and sides of the glass block may be of a thickness sufficient to provide the requisite structual integrity or, in the preferred embodiment, internal ribbing or other structural reinforcement 4 may be incorporated to reduce the material required in the fabrication of such a block while still providing the necessary strength to contain the vacuum and withstand structural and environmental forces. The configuration of such reinforcement should be chosen to minimize internal reflections. The glass is selected to have, in the preferred embodiment, maximum transparency to the spectrum of solar radiant energy. Typically, most of the solar radiant energy is of a wavelength less than 2 microns. In one embodiment of the solar element a panel 6 is provided as the inner face of the element, the panel being sealed to the glass sides of the element by an appropriate glass-to-metal seal.

The material used to form panel 6, and particularly the surface material, should be metal that absorbs more than 40% of the incident solar radiation and has an emissivity of less than 0.04 at 20° C. The term "metal" is used to designate a class of elements, the main property of which is a high conductivity, or loss resistance. It may be contrasted with other classes of elements such as insulators and semiconductors. An excellent material for panel 6 is zinc. It is a metal, absorbs 55% of incident solar radiation, and has an emissivity of 0.034 at 20° C. (For comparison, copper will absorb approximately 25% of such solar radiation, and silver and gold approximately 7% of such solar radiation).

All materials re-radiate absorbed energy. The emission, or re-radiation, of zinc is defined in watts per square meter by the following formula:

$$(0.066)(T/100)^5$$

where T is the temperature of the material expressed in degrees Kelvin. (These and other values and relationships are taken from *Heat Transfer* by Jacob.) For purposes of comparison, the emission of a black body can be defined in watts per square meter as follows:

$$5.67(T/100)^4$$

where again T is the temperature of the black body expressed in degrees Kelvin. Normal environmental temperatures will seldom exceed 300° K. At that temperature the energy reradiated by a black body will be over 30 times as great as the energy re-radiated by a zinc panel. Because of this, a solar element including a zinc inner panel 6 will reach a significantly higher temperature than would a panel formed of a black body material.

So called selective coatings (e.g., semi-conductors) can provide good solar absorption. For instance, a SUNPAK evacuated tube solar collector by Owens-Illinois Inc. of Toledo, Ohio, absorbs 85% of all incident radiation instead of 55% for zinc. However, the emissivity of such selective coatings is significantly larger than for zinc (e.g., SUNPAK has an emissivity of 0.05 while that for zinc is 0.034 at 20° C). This difference becomes quite significant at higher temperatures. At the high temperatures attainable in the preferred furnace, a zinc material is preferable to a semiconductor, even in view of the semiconductor's higher absorptivity, for above about 500° F. the lower emissivity of zinc will result in a higher internal temperature. Also, the zinc coating or material is preferable because of its lower price, ease of fabrication and because it is much less sensitive to the preferred vacuum conditions.

Inner pannel 6 will, of course, re-radiate some of the energy it absorbs. That radiation will be centered in a band that is of significantly longer wavelength (4–16 microns) than the incident solar radiation. For this reason, preferably the glass is chosen to be substantially opaque at wavelengths above 2 microns but transparent to shorter wavelengths. A typical example of such glass will transmit less than 1% of the energy spectrum emitted at 400° C. by the zinc panel, whereas ordinary glass will transmit on the order of 18% of the spectrum emitted at such temperature. Because of this absorption of re-radiated energy by the glass material defining at least the top of the solar element, the structure of the element itself will assist in retaining significant solar energy, and in attaining and maintaining maximum internal temperatures within the solar furnace.

The solar element 2, and particularly its inner and outer faces, should be constructed of a material, and the element should be of a size sufficient, to minimize multiple refractions across the vertical side walls. For example, if the glass material used to construct the element has a refractive index of 1.5, it will reflect 4% of the radiation incident at a right angle, and 9% of the radiation incident at a 60 degree angle. As long as the height of the collector does not exceed 0.557 of its horizontal side dimension, radiation will not be refracted more than once across the vertical sides of the element within an 8 hour sun day centered at noon.

A solar furnace of a preferred construction is shown in vertical cross-section in FIG. 2. Generally the solar furnace 10 is rectangular in shape, being in typical applications of a size on the order of 100 feet in width, 300 feet in length, and 6 feet high. A minimum height improves thermal transfer of solar energy into the furnace. At least one of the outer surfaces of the solar furnace, typically its ceiling, is exposed to solar radiation and is constructed of the solar elements, or blocks, illustrated in FIG. 1. The furnace 10 may include an insulated door 12 in one or more of its side walls. The walls and floor of the furnace preferably are constructed of insulating elements, or blocks. Support of the furnace structure is provided by pillars or columns 14. Such columns are of preferably good insulating material, the conduction of which must be taken into consideration when designing the furnace. The column material is chosen to maximize its weight carrying capacity while minimizing heat loss by conduction. A good compromise is the glass fiber reinforced concrete material developed by Stanford Research Institute of Palo Alto, Calif.

A preferred construction of an insulating element is shown in FIG. 3. The insulating element 20 may be formed as a hollow glass block with a series of internal panels 22. Preferably alternate panels are constructed as black bodies and as perfect reflectors. For example, panel 22a may be a metallic panel of copper, panel 22b a black body panel constructed of a material that absorbs substantially all incident radiation at the operating temperature of the furnace, and panel 22c another metallic panel to reflect substantially all radiation. If desired, the inner surfaces of the faces of the insulating element, namely faces 24, may also bear a reflecting material, or all of the inner panels may be made of a reflective material if desired. The block, and the inner panels as well, may be constructed entirely of glass if desired. Various glasses will absorb virtually all incident wavelength in the infrared spectrum, to serve as a black body. Their surfaces may be metalized to serve as the reflecting panels. Of course, additional panels may be provided if desired, or multiple blocks stacked on top of one another, or the block constructed to contain fewer panels than those shown, all depending on the insulating qualities desired for the block.

The insulating element 20 will absorb energy from the interior of the solar furnace by conduction. The inner face 24 of element 20 will absorb and re-radiate some of that energy to strike panel 22a. Substantially all of this radiation will be reflected back to the inner face 24. However, a small portion of the radiation will be absorbed by panel 22a, even though it is highly reflective, and this absorbed energy will be in turn re-radiated to be absorbed by the black body panel 22b (or again reflected if that panel is of a reflecting material). Panel 22b in turn will radiate the absorbed energy to strike reflective panel 22c, and a small portion of that radiation will be absorbed by the panel. In summary, the series of alternately reflective and absorbing panels (or a series of reflecting panels) within insulating element 20 provide substantial impedance to the transfer of thermal energy by radiation from one face to the other face of the element. Specifically, if the internal temperature of the solar furnace is 300° C., the internal surface of the insulating elements will be subjected to about 6100 watts per square meter. For an insulating element having N internal panels, and constructed as just described, the radiation loss (P) through the element will be (in watts per square meter):

| N | P |
|---|---|
| 1 | 402 |
| 2 | 201 |
| 5 | 80 |
| 10 | 40 |
| 20 | 20 |

(In comparison, to provide an equal insulating value, a concrete wall 12.5 meter thick would have to be used). Of course, such excellent insulating elements have significant applications apart from the furnace herein described. Instead of being rectangular in cross-section, the elements could be round, oval or any other desired shape. They may even be cylinders stacked on their side and such that the interior or exterior-facing half of the cross-section is metalized.

Preferrably the insulating element 20 is made of glass, and evacuated, to minimize conduction and convection of energy from the inner to the outer face of the element. A glass, for example, of a thermal conductivity of 0.001-0.002 cal/cm/°K will be satisfactory; the thickness of the element walls thus will be on the order of 0.5-2 cm. Such elements or blocks are employed to construct the walls and floor of the solar furnace shown in FIG. 2.

It is desirable to locate the solar furnace between the 35th parallels of the earth, and to tilt it facing the equator from the horizontal plane to minimize the average angle of incidence of solar radiation on the face of the solar furnace. Such an orientation is shown in FIG. 4. The face of the furnace 10 lies in a plane, indicated by line 32, which is at an angle 34 to the horizontal plane 36. It can be geometrically shown that the inclination or tilt 34 of the roof of the solar furnace, to minimize the average angle of incidence 38, should be equal to the latitude of the location of the furnace on the face of the earth. Because of such orientation, the rays of the sun at noon on the spring and fall equinox will be orthogonal to the roof of the solar furnace.

The solar elements should be assembled to be as close together as possible on the roof of the furnace, FIG. 2a, to maximize the collection of solar energy. The solar elements conveniently can be fabricated as glass blocks and may be inner-connected or bonded together by cement or other appropriate material, although a closely spaced configuration without bonding would be satisfactory.

While the solar elements are illustrated as generally rectangular in shape, of course they can be triangular, hexagonal or any other shape that may be preferred for the particular structure and application involved. Air spaces between the collectors, or insulators, are not particularly detrimental to over-all operation of the furnace provided the Grashof number for such spaces does not exceed the convection lower limits (i.e., convection heat transfer through such air spaces does not become significant). In other words, the air space between the elements must be small enough for convection not to occur. Air itself is a good insulator. Convection transfer of energy will not occur in the air space if small enough due to the viscosity of air. Thus, in a preferred construction the solar elements (and all other elements of the furnace as well) may be slightly pyramidal in shape, the end facing inward toward the center of the furnace being slightly narrower than the outwardly facing base. Heat within the furnace will cause expansion of the inward end more than the outer base, to result in a closure of air channel between elements, further occluding convection transfer through this space.

The minimum height of both the solar and insulating elements is a function of the material employed to fabricate such elements, as well as of their crosssection and of the thickness of their sides. Such elements as assembled must be of sufficient height that the heat conduction through their side walls from one face to the other face is within tolerable limits. Glass can be readily fabricated to have a sufficiently small heat conduction characteristic.

Figure 5:
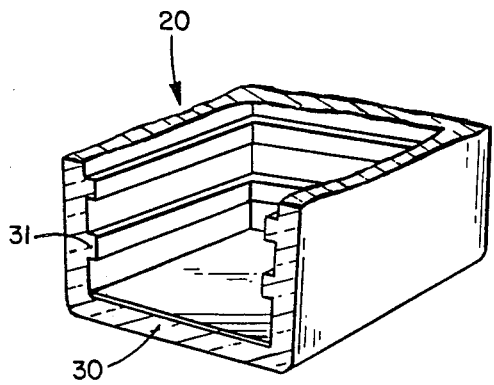
FIG. 5 is a vertical cross-sectional view of a portion of a solar element of modified construction.

As has been noted, in a preferred construction of the solar element the inner panel 6 is fabricated of zinc. In an alternate construction, shown in FIG. 5, the inner panel 30 may also be of glass. The interior face of this panel is coated with a material chosen for its high absorptivity of solar radiation and for its low emissivity of such radiation. It may, for example, be a multi-layer coating, the layer adjacent to the glass panel being chosen for its good bonding characteristics to glass, the interior face being chosen for its high absorptivity and low emissivity of solar radiation. As has been noted, such a suitable interior face material is zinc. Of course, when the inner panel 30 is made of glass, the tranmission of heat collected from the sun to the furnace interior is hampered by that glass and a difference of temperature will occur between the temperature reached by the interior of that panel and the temperature reached in the furnace interior. Such difference of temperature is however small (a few degrees). The cost saving obtained by eliminating the glass to metal seal of the former construction may be a sufficient reason for choosing the latter one. Ribs 31 or other structural reinforcement may be provided.

During daylight hours the solar furnace, oriented as shown in FIG. 4, will absorb and contain solar radiation; its internal temperature will rise as a result of this collection of energy. During nighttime hours particularly with a clear sky, the furnace will face an external or atmospheric environment of low temperature. If the furnace were allowed to radiate energy to its environment, substantial energy could be lost. To minimize such reradiation, preferably a reflective blanket 40 (for example of metalized Mylar) is provided to overlie the roof of the furnace at night, thereby trapping and containing the energy collected during daytime hours. If one prefers to use the insulation described here only partly, wishing to rely on the soil itself as insulator, and the characteristics of the earth on which the furnace is constructed are such that it conducts heat too easily, preferably the earth is treated to modify such characteristics, or replaced with another material to have an acceptably low heat transfer characteristic. Such a material is located in area 42 beneath and adjacent to the furnace. Also, a plastic shield 44 may be employed to define and contain such materials, if desired.

At solar noon, between 70% and 90% of the incident solar energy flux will pass through the atmosphere the actual amount being a function of the transparency of the atmosphere. Such energy transmission also varies with time of day, decreasing rapidly as the sun departs from a vertical orientation; approximately 90% of all solar energy falls on a given point of the earth within an 8 hour span centered at noon.

As has been noted, the energy incident upon the earth is a function of the time of year as well. For example, a horizontal furnace location at a latitude of 23.5° will receive in the winter approximately 70% of the energy incident upon that location in summer. To minimize this fluctuation, preferably the roof of the solar furnace is tilted facing the equator at an angle to the horizontal that is equal to the latitude of the location of the furnace upon the earth's surface. Also, for the foregoing reasons, the solar furnace is particularly useful in latitudes between 35° north and 35° south. Because of the tilt of the furnace, in this range of latitudes the summer and winter exposure to incident solar radiation will be the same within the 8 hours from 8 a.m. to 4 p.m.

In view of the foregoing, assume a solar flux of 800 watts per square meter incident upon the solar elements of the furnace (an average value for the 8 hours of daylight). Of course, a greater solar flux could be achieved, for example, by employing optical elements to direct additional solar energy to the furnace, but a major advantage of this invention is the provision of a high temperature solar furnace without such optical elements. The zinc inner surface of the solar elements will absorb 55% of the incident solar radiation, or 440 watts per square meter for the assumption just stated, reflecting the balance of the incident radiation, or 360 watts per meter square. As has been noted, the emissivity of a zinc material in watts per square meter is expressed as follows:

$$(0.066)(T/100)^5$$

where T is temperature in degrees Kelvin. The temperature of the zinc material will be raised by such solar radiation. Convection currents within the furnace, as well as radiation to the furnace's interior, will heat the furnace and its contents. Finally, the zinc panel of the solar elements will reach a temperature determined by the incident radiation, this temperature being termed the stagnation temperature. For zinc in a vacuum, the stagnation temperature is 309° C. (In comparison, the stagnation temperature of a black body exposed to the same solar flux can be shown to be 72° C.) Because the zinc of the solar elements will radiate energy to the interior of the furnace, and because of the greenhouse effect, the interior of the furnace will reach a higher stagnation temperature. In typical applications, the furnace will reach and is capable of maintaining internal temperatures of 400° C. and greater. In fact, the choice of glass is the limiting material that defines the stagnation temperature.

Such a solar furnace can form a significant part of many different industrial processes. For example, in the simplest form the furnace could be filled with compressed air, and the air heated by solar radiation. A tubular or other configuration of the furnace might be desirable for this application. When electricity is required, the heated air is applied to an appropriate turbine. The fact that the internal temperature of the furnace can reach temperatures of 300° C. and more permits good Carnot efficiencies to be achieved. By performing such heating at constant volume instead of at constant pressure, the work cycle can approach more closely the theoretical Carnot cycle for, in general, work available while heating at constant pressure is wasted.

As another example, the solar furnace can be loaded with oil shale, and the shale heated to extract shale oil. Because the temperature of the solar furnace is well defined and limited, thermal polymerization of the shale oil will be minimized. Also, such a furnace will generate shale gas as well, and the generated gas will not be diluted by nitrogen as would occur in the usual system. Other applications for the solar furnace include various industrial processes involving or requiring high temperatures such as chemical reactions or physical treatment (e.g., annealing) requiring such temperatures.

In such applications and particularly when gas is generated in the process, it is advantageous to employ a family of solar furnaces. As an example, assume three solar furnaces. Their operation might be arranged as set forth in Schedule A on the next page.

In the first phase, the cooling gas in furnace I preheats furnace II while the sun continues to heat the preheated furnace III. In the second phase, furnace I is unloaded and loaded, while the very hot gas from furnace III preheats further the preheated furnace II. In the third phase, furnace I is preheated by the gas from cooling furnace III while the preheated furnace II is heated further by the sun, etc. Each heating phase may last for many days so that the sun may be effective even within the preheating phases.

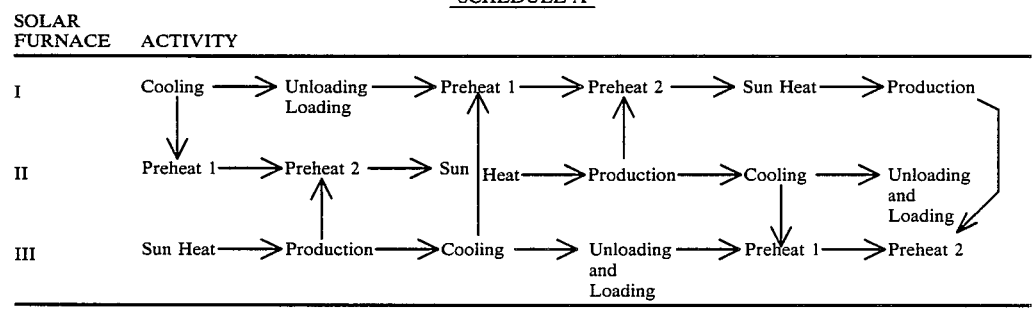

SCHEDULE A

Figure 6:
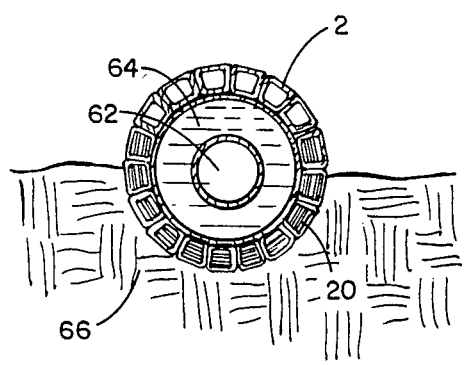
FIG. 6 is a vertical cross-sectional view of a conduit constructed in accordance with the invention.

As still another example of the capability of the construction herein described, the solar elements may be employed to form a conduit for the transfer of heated materials. This conduit may be termed a caloregenerating duct, since the material within the conduit or duct does not loose heat to the environment but in fact can gain heat by passage through the duct. Such a construction is illustrated in FIG. 6. In it, a duct or conduit 62 is contained within a heat mass 64 that is surrounded by solar elements or blocks 2 at a level that is exposed to substantial solar radiation, and insulating blocks 20 for the remainder of its circumference. It is supported on earth or another material 66, the insulating qualities of which have been adjusted if necessary to achieve and maintain the desired internal temperature within the duct. Of course, the duct could be any of various cross-sections, round, oval, rectangular or otherwise.

While preferred embodiments of the invention have been described, variations will be apparent to those skilled in this art, and may be made in accordance with the teachings herein, while retaining the stated advantages. Accordingly, the scope of the invention is not limited to the preferred embodiments which have been set forth, but rather is stated in the following claims.

I claim:

1. An element for a solar furnace comprising a body including a wall member, a portion of which is substantially transparent to solar radiation wavelengths shorter than about 2 microns, and a panel having a surface spaced from and facing said transparent portion, said panel having a depth of material at said surface, which material consists essentially of zinc metal, said material covered surface being uncovered facing said wall member, said depth of said zinc metal being sufficient to be opaque to incident solar radiation and absorptive of said substantial portion of its energy, and having an emissivity of less than 0.04 at 20 degrees C., the said surface and wall member at least partially defining a cavity formed by said body which is impervious to atmospheric gases, said cavity being substantially evacuated, and said panel being adapted for transfer of heat therefrom.

2. An element according to claim 1 in which the said wall and panel define a tubular conduit.

3. An element according to claim 1 in which said wall and said panel fully define said cavity, said cavity being closed by them.

4. An element according to claim 1 in which said wall member portion is substantially opaque to radiation of wavelengths longer than about 2 microns.

5. An element according to claim 1 in which said panel has made of zinc, and forms a continuation of said wall.

6. An element according to claim 5 in which the panel is a surface facing outside of said cavity to enable said heat transfer.

7. An element according to claim 6 in which said wall member portion is constructed of glass.

8. An element according to claim 7 in which said panel is directly connected to said wall member.

9. A solar furnace comprising a roof structure exposed to solar radiation comprising a plurality of elements according to claim 1, and a plenum adjacent to said panel and outside of said cavity for enabling the conductive transfer of heat from said panel.

10. A solar furnace according to claim 9 in which said plenum is at least partially bounded by insulation means.

11. A solar furnace according to claim 9 in which said panel is substantially entirely constructed of zinc metal.

* * * * *